United States Patent [19]

McIntosh

[11] Patent Number: 4,718,754

[45] Date of Patent: Jan. 12, 1988

[54] OPTICAL LINE SIMULATOR

[75] Inventor: Graham D. McIntosh, Reading, England

[73] Assignee: Plessey Overseas Limited, Ilford, England

[21] Appl. No.: 860,156

[22] Filed: May 6, 1986

[30] Foreign Application Priority Data

May 8, 1985 [GB] United Kingdom ............... 8511591

[51] Int. Cl.⁴ .......................... G02B 7/00; G02B 9/00; G02B 5/08; G01N 21/00
[52] U.S. Cl. .................................. 350/574; 350/163; 350/446; 350/602; 356/73.1
[58] Field of Search ............... 350/96.15, 96.16, 96.18, 350/574, 602, 618, 446, 642, 163; 356/352, 73.1

[56] References Cited

U.S. PATENT DOCUMENTS

| | | | |
|---|---|---|---|
| 4,077,701 | 3/1978 | Steensma et al. | 350/96.18 |
| 4,281,925 | 8/1981 | Forrest et al. | 356/243 |
| 4,364,639 | 12/1982 | Sinclair et al. | 350/96.15 |
| 4,558,950 | 12/1985 | Ulrich et al. | 356/352 |

FOREIGN PATENT DOCUMENTS 873051 10/1981 U.S.S.R. ............... 356/352

Primary Examiner—John K. Corbin
Assistant Examiner—Vincent J. Lemmo
Attorney, Agent, or Firm—Michael F. Oglo; Julian C. Renfro

[57] ABSTRACT

An optical line simulator comprising input and output ports for coupling to optical fiber, a partially transmissive plane mirror interposed in the optical path between the ports, a reflector adjacent to the mirror and a variable density neutral filter in the optical path. This device simulates path delay and loss. These factors can be varied independently by adjusting the distance between the mirror and the reflector, and by varying the filter density.

5 Claims, 2 Drawing Figures

OPTICAL LINE SIMULATOR

TECHNICAL FIELD

The present invention concerns an optical line simulator.

In the test and design phase of transmission equipment development, it is often requisite to reproduce those optical conditions likely to occur in the field. The delay of an optical signal propagated along an optical line will depend on the optical length of the line, and this in turn will depend on geometric dimensions and on refractive indices of the line medium, factors dependant inter alia on ambient conditions. The optical signal received will also depend on line loss, i.e. signal attenuation, and chromatic dispersion within the line, factors also dependant on ambient conditions and on line type and quality.

BACKGROUND ART

It has been commonplace practice to employ drum wound fibres in the test environment. This involves use of bulky and costly material, and it is difficult and/or cumbersome to vary parameters and to reproduce all the conditions likely to arise in system use.

Erstwhile, and because of past scarcity of suitable fibres, it has also been practice to employ a pulse shuttling technique. Accordingly, a fixed length of fiber is interposed between reflectors and a long length fiber simulated by applying an input pulse and selecting a delayed output pulse, corresponding to a predetermined multiple of transits of the single fiber.

DISCLOSURE OF THE INVENTION

The present invention is intended as a flexible alternative to the foregoing. It is intended to provide test apparatus for simulating the effects of an optical line on a modulated signal.

In accordance with this invention there is thus provided an optical line simulator comprising:

input and output fiber coupling means for coupling light from an input fiber interface to an output fiber interface;

a partially transmissive plane mirror interposed in the optical path between the input and output fiber interfaces;

a reflector, displaced from the plane mirror, arranged to reflect light transmitted through the plane mirror, back towards the plane mirror; adjustment means, co-operative with the mirror and the reflector, for varying the displacement therebetween; and, a variable density neutral filter, located in the optical path outwith the mirror and the reflector.

The simulator apparatus thus disclosed simulates path delay and loss. These factors can be varied independantly by adjusting the mirror displacement and the filter density, respectively. The apparatus thus can be used to simulate a large variation of possible link configurations and, therefore, large quantities of fibre are not requisite.

The apparatus aforesaid may be configured for transmissive or reflective mode operation:

In one form of the invention the coupling means may be provided as a single lens system and a non-transmissive reflector - a full-silvered plane mirror or corner cube reflector adopted. In this form of the invention, light is reflected back to the input fiber itself, which fiber also acts, therefore, as the output fiber. A splitter may be used, co-operative with this fiber, for channeling the reflected signal to a test receiver or detector. In this form, the partially transmissive mirror may be frequency selective, and the reflectivity may be variable. It is thus possible to simulate dispersion and to vary the same as required.

In an alternative form of the invention, the reflector also may be a partially transmissive plane mirror, and may be arranged parallel to the mirror first-mentioned, to provide an etalon structure.

BRIEF INTRODUCTION OF THE DRAWINGS

In the drawings accompanying this specification:

FIG. 1 is an illustration of an optical line simulator, an embodiment of this invention in which the optical components are arranged for reflective mode operation; and, FIG. 2 is an illustration of an alternative embodiment in which the optical components are arranged for transmissive mode operation.

DESCRIPTION OF THE PREFERRED EMBODIMENT

Embodiments of the invention will now be described, by way of example only, with reference to the accompanying drawings.

Figure 1:
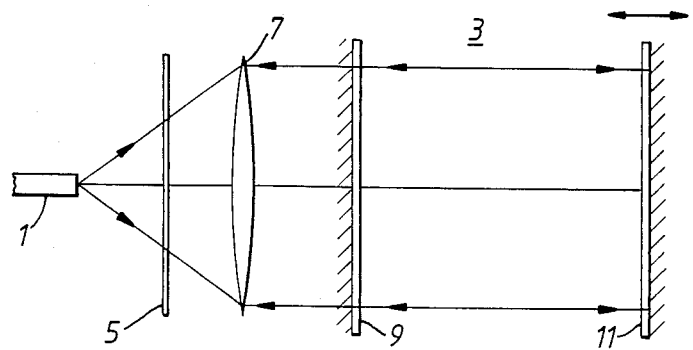

In the apparatus shown in FIG. 1 a pulse modulated light beam is propagated from a input fiber 1 through a simulator 3 and returned to the originating fiber 1. This simulator 3, one arranged thus for reflective mode operation, comprises a variable neutral density filter 5, a collimating lens system 7, a variable reflective partially transmitting plane mirror 9 and, displaced from this, a reflector 11. The latter, as shown, has the form of a full-silvered plane mirror arranged parallel with the variable reflective mirror 9 and transverse to the optical path of the modulated light beam. It will be appreciated that a corner cube reflector could equally well be used in place of the plane mirror 11.

The simulator 3 operates in the following manner: When the beam falls initially on the partially transmissive plane mirror 9, part of the beam is immediately reflected back through the lens system 7 and attenuator 5 to the input fibre 1. The rest of the beam travels on through the system and is reflected at the reflector 11. The beam returns along its original path until it reaches the variable reflective plane mirror 9 where part is again reflected back towards the reflector 11 and the remaining portion passes through to the imaged by the lens system 7 at the fibre interface 1. This second beam that arrives at the fibre 1 is delayed with respect to the first by an amount in proportion to the separation between the variable reflective mirror 9 and the reflector 11. Therefore successive passes through the system not only cause the light to drop off in power but also delay each successive fraction. The mirror separation can be varied to change the delays.

A light pulse can therefore be broadened or narrowed by increasing or decreasing the spacing between the reflector 11 and the mirror 9 to simulate different lengths of line. The shape of the pulse is controlled by the variable reflective mirror 9. This simulates dispersion in an optical line.

The variable neutral density filter 5, placed in front of the fiber 1, attenuates each fraction of the pulse by an equal and predetermined amount, simulating loss in an optical line.

Figure 2:
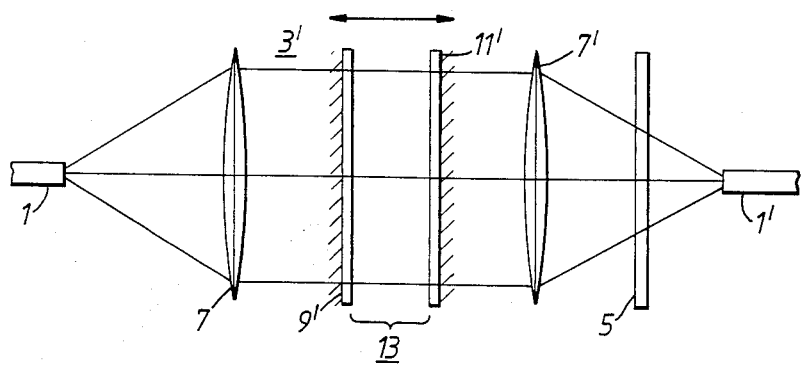

In the alternative apparatus shown in FIG. 2, a pulse modulated light beam is propagated from an input fiber 1 through a modified simulator 3' and directed onto an output fiber 1'. This modified simulator 3', one arranged for transmissive mode operation, comprises: a first collimating lens system 7; am etalon 13 formed of two parallel partially transmitting plane mirrors 9', and 11', a second focussing lens system 7' and a variable neutral density filter 5.

In operation much of the light is reflected at the first mirror 9'. However, light entering the etalon 13 reflects back and forth in the etalon, being reflected at each of the mirrors 9' and 11'. A small portion of the light is transmitted on each pass. The delay between consecutive pulse fractions is proportional to the transit time within the cavity of the etalon 13. In this manner a temporal pulse dispersion is effected.

As in the previous example, line loss is simulated by the attenuation of the neutral filter, and the density is selected by variation of the filter, as appropriate.

I claim:

1. An optical line simulator comprising: input and output fiber coupling means for coupling light from an input fiber interface to an output fiber interface; a partially transmissive plane mirror interposed in the optical path between the input and output fiber interface; a reflector, displaced from the plane mirror, arranged to reflect light transmitted through the plane mirror, back towards the plane mirror; adjustment means, co-operative with the mirror and the reflector, for varying the displacement therebetween; and, a variable density neutral filter, located in the optical path but not in the portion of the optical path between the mirror and the reflector.

2. An optical line simulator according to claim 1 comprising a single lens system and a non transmission reflector adapted to reflect light to the input fiber, said input fiber and said output fiber being one and the same.

3. An optical line simulator according to claim 2 in which said non transmissive reflector comprises a full-silvered plain mirror.

4. An optical line simulator according to claim 1 in which said partially transmissive mirror comprises a frequency selective variable reflectivity mirror.

5. An optical line simulator according to claim 1 in which said reflector also comprises a partially transmissive plain mirror arranged parallel to said first said mirror, the two mirrors providing an etalon structure.

* * * * *